United States Patent
Li et al.

(10) Patent No.: US 10,484,944 B2
(45) Date of Patent: Nov. 19, 2019

(54) DATA TRANSMISSION METHOD, APPARATUS, AND DEVICE

(71) Applicant: HUAWEI TECHNOLOGIES CO., LTD., Shenzhen, Guangdong (CN)

(72) Inventors: Yunbo Li, Shenzhen (CN); Zhou Lan, Shenzhen (CN); Meilu Lin, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 140 days.

(21) Appl. No.: 15/637,424

(22) Filed: Jun. 29, 2017

(65) Prior Publication Data

US 2017/0303196 A1    Oct. 19, 2017

Related U.S. Application Data

(63) Continuation of application No. PCT/CN2014/095836, filed on Dec. 31, 2014.

(51) Int. Cl.
*H04W 52/02* (2009.01)
*H04W 28/20* (2009.01)
(Continued)

(52) U.S. Cl.
CPC ....... *H04W 52/0212* (2013.01); *H04W 24/08* (2013.01); *H04W 28/20* (2013.01);
(Continued)

(58) Field of Classification Search
CPC ............ H04W 24/08; H04W 52/0212; H04W 52/0229; H04W 52/50; H04W 72/0493;
(Continued)

(56) References Cited

U.S. PATENT DOCUMENTS

| 8,345,547 B2 | 1/2013 | Park |
| 2007/0060155 A1 | 3/2007 | Kahana et al. |

(Continued)

FOREIGN PATENT DOCUMENTS

| CN | 101253784 A | 8/2008 |
| CN | 103634891 A | 3/2014 |

(Continued)

OTHER PUBLICATIONS

International Search Report, dated Oct. 8, 2015, in International Application No. PCT/CN2014/095836 (4 pages).

(Continued)

*Primary Examiner* — Kyaw Z Soe
(74) *Attorney, Agent, or Firm* — Womble Bond Dickinson (US) LLP

(57) ABSTRACT

A data transmission method, including: determining, according to a maximum power value detected by performing a CCA on a primary channel in one or more processing time periods, a power value interval to which the maximum power value detected by performing the CCA belongs, where the determined power value interval is one of one or more power value intervals that do not overlap each other; obtaining a transmit power spectral density according to the determined power value interval, where there is a one-to-one correspondence between the one or more power value intervals and one or more transmit power spectral densities; and when a TXOP is obtained, performing data transmission on a transmission channel by using a power spectral density that is not greater than the transmit power spectral density.

15 Claims, 11 Drawing Sheets

(51) Int. Cl.
*H04W 72/04* (2009.01)
*H04W 84/12* (2009.01)
*H04W 24/08* (2009.01)
*H04W 52/50* (2009.01)
*H04W 74/08* (2009.01)

(52) U.S. Cl.
CPC ....... *H04W 52/0229* (2013.01); *H04W 52/50* (2013.01); *H04W 72/04* (2013.01); *H04W 72/0493* (2013.01); *H04W 74/0808* (2013.01); *H04W 84/12* (2013.01); *Y02D 70/142* (2018.01)

(58) Field of Classification Search
CPC . H04W 74/0808; H04W 28/20; H04W 72/04; H04W 84/12; Y02D 70/142
See application file for complete search history.

(56) References Cited

U.S. PATENT DOCUMENTS

| | | | |
|---|---|---|---|
| 2011/0164514 A1 | 7/2011 | Afkhamie et al. | |
| 2013/0223250 A1* | 8/2013 | Matsuo | H04W 74/0808 370/252 |
| 2014/0161079 A1 | 6/2014 | Noh et al. | |
| 2014/0169357 A1 | 6/2014 | Noh et al. | |
| 2015/0009907 A1* | 1/2015 | Merlin | H04W 74/0808 370/329 |
| 2015/0071215 A1* | 3/2015 | Tian | H04W 24/08 370/329 |
| 2015/0373652 A1* | 12/2015 | Dabeer | H04W 52/246 455/522 |
| 2016/0157264 A1* | 6/2016 | Wang | H04W 74/0808 370/329 |
| 2016/0164646 A1* | 6/2016 | Kwon | H04L 43/16 370/252 |

FOREIGN PATENT DOCUMENTS

| | | |
|---|---|---|
| EP | 2589164 | 1/2012 |
| WO | 2007/027442 A2 | 3/2007 |
| WO | 2011/053775 A1 | 5/2011 |
| WO | 2012/002705 A2 | 1/2012 |

OTHER PUBLICATIONS

James Wang et al.: "Increased Network Throughput with Channel Width Related CCA and Rules," ieee802.11-14/0880r1, Jul. 14, 2014.
Robert Stacey et al.: "Proposed Specification Framework for TGax," ieee802.11-14/1453-r2, Nov. 5, 2014.
International Search Report dated Aug. 10, 2015 in corresponding International Patent Application No. PCT/CN2014/095836.
Ramachandran I et al.: "Clear channel assessment in energy constrained wideband wireless networks," IEEE Wireless Communications, IEEE Service Center, Piscataway, NJ, US, vol. 14, No. 3, Jun. 1, 2007, pp. 70-78, XP011189169.
Extended European Search Report dated Dec. 14, 2017 in corresponding European Patent Application No. 14909461.1.
First Office Action dated Apr. 29, 2019 in corresponding Chinese Patent Application No. 201480083782.8 (3 pages).
Search Report dated Apr. 3, 2019 in corresponding Chinese Patent Application No. 201480083782.8 (2 pages).

* cited by examiner

DATA TRANSMISSION METHOD, APPARATUS, AND DEVICE

CROSS-REFERENCE TO RELATED APPLICATIONS

This application is a continuation of International Application No. PCT/CN2014/095836, filed on Dec. 31, 2014, the disclosure of which is hereby incorporated by reference in its entirety.

TECHNICAL FIELD

Embodiments of the present invention relate to the communications technologies, and in particular, to a data transmission method, apparatus, and device.

BACKGROUND

Clear channel assessment (CCA for short) adjustment is a hot topic currently researched in the IEEE 802.11ax standard. On an unlicensed spectrum, before sending data, a station needs to first detect a channel status. When a detected power is greater than a CCA threshold, it is determined that a channel is in a busy state, and data sending is not allowed. Conversely, when the detected power is less than or equal to the CCA threshold, the station may perform backoff. After the backoff ends, the station sends the data.

Increasing the CCA threshold enables the station to further perform the backoff without being affected by an interfering signal within a range that is greater than an original CCA threshold and less than an adjusted CCA threshold, so that a probability of spatial reuse may be increased. Emulation proves that increasing the CCA threshold within a certain range may increase throughput of a system, and the range that may be increased depends on a specific application scenario.

Mediatek proposes a method for associating the CCA threshold with transmission bandwidth, so as to increase a probability of accessing a channel by a station. However, in the solution proposed by Mediatek, in some scenarios, the station cannot use a power spectral density as large as possible to send data, that is, a received signal-to-noise ratio of a receiving station is not maximized. Therefore, transmission efficiency of a system cannot be maximized.

SUMMARY

In the present invention, a data transmission method, apparatus, and device are proposed, so that a probability of accessing a channel by a station is increased, and the station may use a power spectral density as large as possible to perform data transmission, so as to maximize transmission efficiency of a system.

According to a first aspect, an embodiment of the present invention proposes a data transmission method, including:

determining, according to a maximum power value detected by performing a clear channel assessment CCA on a primary channel in one or more processing time periods, a power value interval to which the maximum power value detected by performing the CCA belongs, where the determined power value interval is one of one or more power value intervals that do not overlap each other;

obtaining a transmit power spectral density according to the determined power value interval, where there is a one-to-one correspondence between the one or more power value intervals and one or more transmit power spectral densities; and when a transmit opportunity TXOP is obtained, performing data transmission on a transmission channel by using a power spectral density that is not greater than the transmit power spectral density.

According to a second aspect, an embodiment of the present invention proposes a data transmission device, including a processor, a memory, a transmitter, and a bus, where the processor, the memory, and the transmitter are connected by using the bus to perform data transmission, and the memory is configured to store data processed by the processor;

the processor is configured to determine, according to a maximum power value detected by performing a clear channel assessment CCA on a primary channel in one or more processing time periods, a power value interval to which the maximum power value detected by performing the CCA belongs, where the determined power value interval is one of one or more power value intervals that do not overlap each other; and obtain a transmit power spectral density according to the determined power value interval, where there is a one-to-one correspondence between the one or more power value intervals and one or more transmit power spectral densities; and the transmitter is configured to: when a transmit opportunity TXOP is obtained, perform data transmission on a transmission channel by using a power spectral density that is not greater than the transmit power spectral density obtained by the processor.

In the embodiments of the present invention, according to a maximum power value detected by performing a clear channel assessment CCA on a primary channel in one or more processing time periods, a power value interval to which the maximum power value detected by performing the CCA belongs is determined; and according to the determined power value interval, a transmit power spectral density is obtained, where there is a one-to-one correspondence between the one or more power value intervals and one or more transmit power spectral densities, that is, the one-to-one correspondence between the power value interval and the transmit power spectral density indicates an optimal transmit power spectral density under a channel status detected by performing a CCA. In this way, a corresponding power value interval is determined by considering the maximum power value detected by performing the CCA on the primary channel, so as to obtain a transmission channel and a transmit power spectral density that are most suitable for a current channel status, so that a probability of accessing a channel by a station is increased, and the station may use a power spectral density as large as possible to perform data transmission. When a transmit opportunity TXOP is obtained, a power spectral density that is not greater than the transmit power spectral density is used on the transmission channel to perform data transmission, so as to maximize transmission efficiency of a system. Further, when the maximum value of the power value interval is larger, the transmit power spectral density is lower, and interference caused to another signal on the primary channel is weaker. Therefore, when communication quality of another signal is ensured, a channel may be accessed for communication, a probability of accessing the channel may be increased, and a system resource may be more fully utilized.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
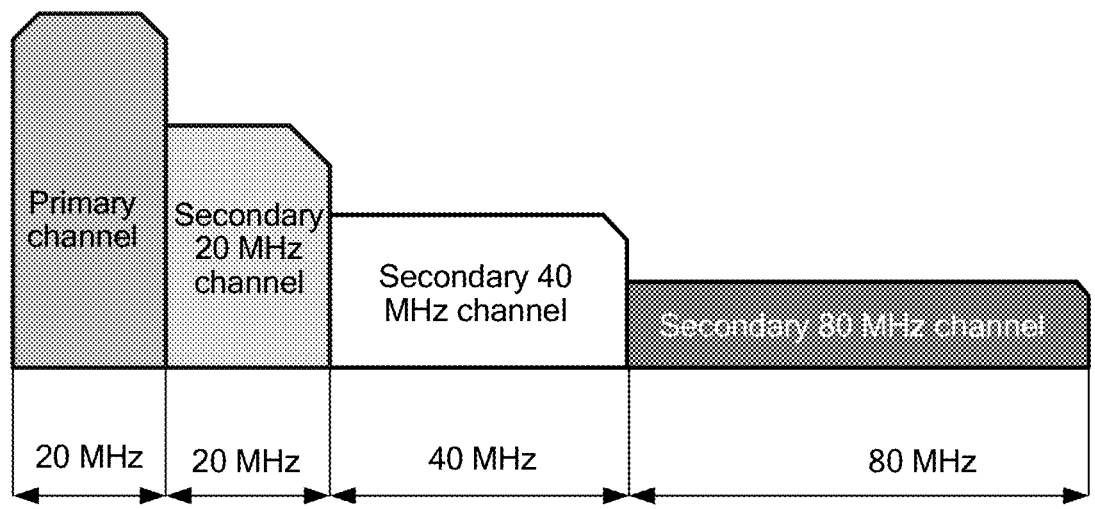
FIG. 1 is a schematic diagram of a primary channel and multiple secondary channels.

Currently, in the IEEE 802.11 standard, in a process of performing channel detection and backoff, a CCA threshold is fixed and does not change with change of data transmission bandwidth. There is a direct relationship between a transmit power spectral density and transmission bandwidth when a transmit power is definite. Larger bandwidth indicates a lower transmit power spectral density, and further indicates a smaller range affected in a transmission process.

In embodiments of the present invention, a data transmission method is proposed. By using a solution in which data transmission is performed by selecting a transmit power spectral density, a probability of accessing a channel by a station is increased, and the station may use a power spectral density as large as possible to perform data transmission, so as to maximize transmission efficiency of a system.

In the embodiments of the present invention, the power spectral density is defined as dividing the transmit power by the bandwidth, for example, a 20 MHz-bandwidth power spectral density PD20M=a transmit power/20 MHz, a 40 MHz-bandwidth power spectral density PD40M=a transmit power/40 MHz, a 80 MHz-bandwidth power spectral density PD80M=a transmit power/80 MHz, and a 160 MHz-bandwidth power spectral density PD160M=a transmit power/160 MHz. A power spectral density of other bandwidth is also obtained in a similar manner. In addition, PD20M, PD40M, PD80M, and PD160M indicate only a power spectral density value, and has nothing to do with specific channel bandwidth, for example, a power spectral density PD40M may be used on a 20 MHz-bandwidth channel to perform data transmission.

In the embodiments of the present invention, a station is used as an execution body, but a data transmission method provided in the embodiments of the present invention may be performed by a station, an access point, a terminal, or a network node, which is not limited. Specifically, an access point (AP for short, Access Point in English) in the embodiments of the present invention is also referred to as a wireless access point, a hotspot, or the like. Specifically, the AP may be a terminal device or a network device that carries a WiFi chip. Optionally, the AP may a device that supports the 802.11ax standard. Further, optionally, the AP may be a device that supports multiple WLAN (English: Wireless Local Area Network; Chinese: Wireless Local Area Network) standards such as the 802.11ac standard, the 802.11n standard, the 802.11g standard, the 802.11b standard, and the 802.11a standard. Specifically, a station (STA for short, Station in English) in the embodiments of the present invention may be a wireless communications chip, a wireless sensor, or a wireless communications terminal, such as a mobile phone supporting a WiFi (Wireless Fidelity) communication function, a tablet computer supporting a WiFi communication function, a set top box supporting a WiFi communication function, or a computer supporting a WiFi communication function. Optionally, the station may support the 802.11ax standard. Further, optionally, the station supports multiple WLAN standards, such as the 802.11ac standard, the 802.11n standard, the 802.11g standard, the 802.11b standard, and the 802.11a standard.

FIG. 1 is a schematic diagram of a primary channel and multiple secondary channels. As shown in FIG. 1, the primary channel includes a 20 MHz-bandwidth primary channel, and multiple secondary channels include a 20 MHz-bandwidth secondary 20 MHz channel, a 40 MHz-bandwidth secondary 40 MHz channel, and an 80 MHz-bandwidth secondary 80 MHz channel. Optionally, all the multiple secondary channels may be on two sides of the primary channel, for example, the secondary 20 MHz channel is located on one side of the primary channel, the secondary 40 MHz channel is located on the other side of the primary channel, and the secondary 80 MHz channel is located on either side of the primary channel.

In addition, the secondary channel may also be referred to as a subordinate channel, multiple subordinate channels include a 20 MHz-bandwidth subordinate 20 MHz channel, a 40 MHz-bandwidth subordinate 40 MHz channel, and an 80 MHz-bandwidth subordinate 80 MHz channel.

Figure 2:
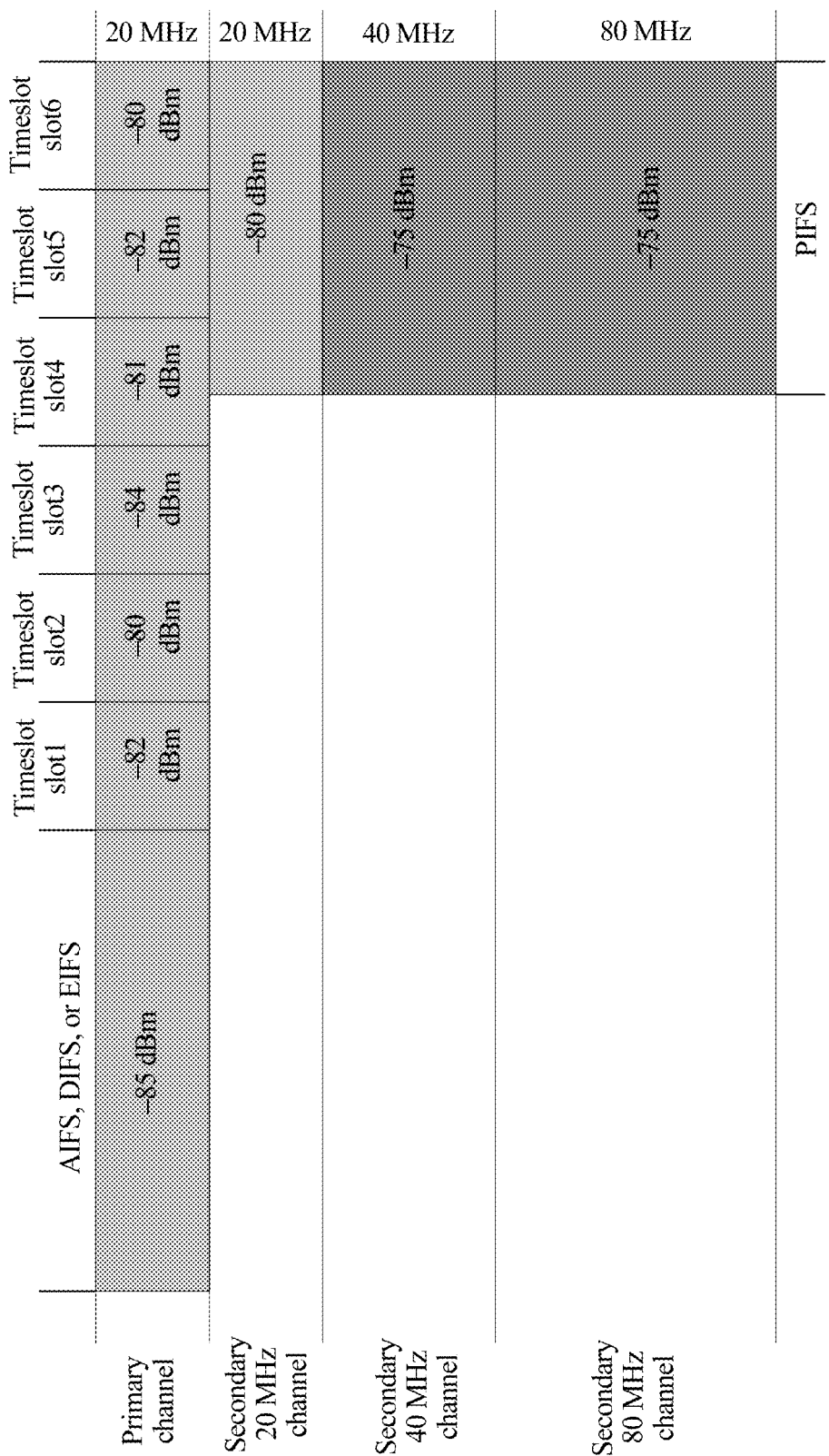
FIG. 2 is a schematic diagram of performing CCA detection on a primary channel and multiple secondary channels.

FIG. 2 is a schematic diagram of performing CCA detection on a primary channel and multiple secondary channels. As shown in FIG. 2, the CCA detection is performed on a primary channel and three secondary channels in FIG. 1. First, within duration of an arbitration interframe space (AIFS for short), an extended interframe space (EIFS for short), or a distributed coordination function interframe space (DIFS for short), the CCA detection is performed on the primary channel, for example, a detected power is −85 dBm. If the detected power is less than a preset CCA threshold, backoff begins. A backoff process is controlled by a backoff timer. The backoff timer is set to B_random timeslots. B_random is a randomly determined integer from 0 to CW (including 0 and CW), and CW is equal to 7, 15, 31, 63, or the like.

The CCA detection is successively performed on each timeslot of the backoff. If a power obtained by detecting a current timeslot is less than the preset CCA threshold, the backoff timer decreases by 1, and performs CCA detection on a next timeslot. Otherwise, it is determined that the primary channel is busy, the backoff timer suspends, indicating that the backoff timer pauses (without decreasing by 1), but continues performing the CCA detection on the channel. When a power detected by performing the CCA within duration of the AIFS, the DIFS, or the EIFS again is less than the preset CCA threshold, the backoff timer restarts (that is, the backoff timer continues, in the foregoing manner, progressively decreasing starting from a value obtained when the backoff timer pauses last time, suspending, or the like). When a value of the backoff timer is 0, it indicates that detection on the last timeslot of the primary channel is completed, that is, it indicates that detection on all timeslots of the primary channel is completed, and the station obtains a transmit opportunity (English: Transmission Opportunity, TXOP for short). For example, the backoff is performed on six timeslots on the primary channel, a value of the backoff timer is 6. The CCA detection is successively performed on the six timeslots. Results of the CCA detection on the timeslots (−82 dBm, −80 dBm, −84 dBm, −81 dBm, −82 dBm, and −80 dBm) are all less than the preset CCA threshold (it is assumed that the threshold is −79 dBm), and the backoff timer successively decreases by 1. When the CCA detection on the last timeslot is completed, and a result of the CCA detection is −80 dBm (less than −79 dBm), a value of the backoff timer decreases from 1 to 0. In this case, the station obtains a transmit opportunity TXOP.

After the value of the backoff timer decreases to 0, CCA detection performed on the multiple secondary channels within duration of a point coordination function interframe space (PIFS for short) tightly close to a moment at which the value of backoff timer decreases to 0 is determined so as to determine whether these secondary channels are idle. For example, the CCA detection is performed on the secondary 20 MHz channel, so as to determine whether the secondary 20 MHz channel is idle; if a power of the secondary 20 MHz channel detected by performing the CCA is less than the preset CCA threshold, it is determined that the secondary 20 MHz channel is idle; otherwise, the secondary 20 MHz channel is busy (not idle). It may be determined, in a similar manner, that any multiple secondary channels such as the secondary 40 MHz channel and the secondary 80 MHz channel are idle or busy. As shown in FIG. 2, within the duration of the PIFS, a result of the CCA detection on the secondary 20 MHz channel is −80 dBm (less than −79 dBm, and it is assumed that a CCA threshold of the secondary 20 MHz channel is −79 dBm), and the secondary 20 MHz channel is idle; a result of the CCA detection on the secondary 40 MHz channel is −75 dBm (greater than −79 dBm, and it is assumed that a CCA threshold of the secondary 40 MHz channel is −79 dBm), and the secondary 40 MHz channel is busy; a result of the CCA detection on the secondary 80 MHz channel is −75 dBm (greater than −79 dBm, and it is assumed that a CCA threshold of the secondary 80 MHz channel is −79 dBm), and the secondary 80 MHz channel is busy.

In addition, preset CCA thresholds for the primary channel and each secondary channel in the one or more secondary channels may be different, or certainly, may be the same, that is, one CCA threshold is set for all channels. The threshold setting should be determined according to an actual situation, for example, in the 802.11 standard, a CCA threshold preset for the primary channel is −62 dBm or −82 dBm; a CCA threshold preset for the secondary 20 MHz is −72 dBm or −82 dBm; and a CCA threshold preset for the secondary 40 MHz channel is −59 dBm or −72 dBm. The preset CCA threshold used in this embodiment of the present invention indicates that a value used for determining whether a channel is idle or busy is needed. A specific value does not need to be limited, and does not affect implementation of this embodiment of the present invention.

Figure 3A:
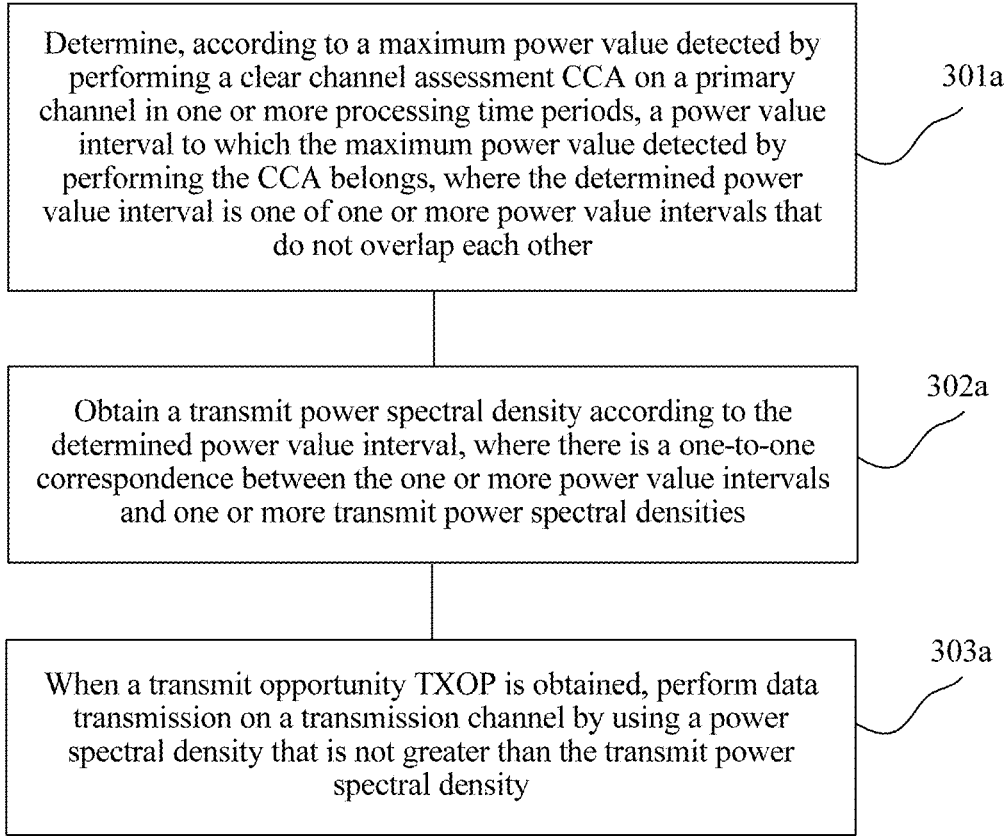
FIG. 3a is a schematic diagram of a data transmission method according to an embodiment of the present invention.

FIG. 3a is a schematic diagram of a data transmission method according to an embodiment of the present invention. As shown in FIG. 3a, the method includes the following steps.

Step 301a: Determine, according to a maximum power value detected by performing a clear channel assessment CCA on a primary channel in one or more processing time periods, a power value interval to which the maximum power value detected by performing the CCA belongs, where the determined power value interval is one of one or more power value intervals that do not overlap each other.

That is, a station determines a transmit power spectral density according to a channel status of the primary channel, such as whether the channel is idle or not, or a degree of interference on the channel. The station performs CCA detection on the primary channel, so as to obtain a result of the CCA detection. For example, for a power value detected by performing the CCA, a maximum power value in power values detected in an entire CCA detection process before a TXOP is obtained is the maximum power value detected by performing the CCA; the maximum power value detected by performing the CCA may be a measurement manner of the channel status, or may represent a status of a channel to some extent. Therefore, the CCA detection is performed in one or more processing time periods, so as to obtain a maximum power value detected by performing the CCA and determine a power value interval to which the maximum power value belongs, that is, if the maximum power value falls within a power range indicated by a specific power value interval in the one or more power value intervals, the specific interval is the determined power value interval. The determined power value interval is one of the one or more power value intervals that do not overlap each other.

Further, the one or more power value intervals that do not overlap each other may be all half-open half-closed intervals, for example, may be all left-open right-closed intervals, or left-closed right-open intervals. Specifically, the one or more power value intervals that do not overlap each other may be: (−∞, −82 dBm), [−82 dBm, −79 dBm), [−79 dBm, −76 dBm), and [−76 dBm, −73 dBm); or the one or more power value intervals that do not overlap each other may be: (−∞, −82 dBm], (−82 dBm, −79 dBm], (−79 dBm, −76 dBm], and (−76 dBm, −73 dBm].

It should be understood that the time period in which the CCA detection is performed includes at least time used for determining whether the channel is idle, such as the duration of the AIFS, the DIFS, or the EIFS, and various timeslots in which the backoff is performed. The one or more processing time periods in this embodiment of the present invention refer to time periods from the duration of the AIFS, the DIFS, or the EIFS in which the CCA detection is continuously performed, for example, when the backoff timer suspends, the one or more processing time periods include the duration of the AIFS, the DIFS, or the EIFS, and timeslots from a timeslot in which the backoff timer starts the backoff to a timeslot in which the value of the backoff timer is 0 (between which the backoff timer does not suspend again); when the backoff timer does not suspend, the one or more processing time periods include any one of the duration of the AIFS, the DIFS, or the EIFS, and various timeslots in which the backoff is performed.

Step 302a: Obtain a transmit power spectral density according to the determined power value interval, where there is a one-to-one correspondence between the one or more power value intervals and one or more transmit power spectral density.

Specifically, the one-to-one correspondence between the one or more power value intervals and one or more transmit power spectral density meets: a smaller maximum value of the power value interval corresponds to a higher transmit power spectral density; or a larger minimum value of the power value interval corresponds to a lower transmit power spectral density.

It should be noted that according to the foregoing condition that the one-to-one correspondence between the one or more power value intervals and one or more transmit power spectral densities meets, it may be further obtained that a smaller maximum power value detected by performing the CCA corresponds to a higher transmit power spectral density. A smaller maximum power value detected by performing the CCA indicates weaker channel interference or lighter impact on this station caused by performing communication for another signal on the channel. Therefore, a larger transmit power spectral density may be used for communication by this station, so as to ensure that this station may perform communication with optimal quality under impact of interference, or ensure that this station may perform communication with optimal communication quality without affecting normal communication of another signal.

It should be understood that a smaller maximum value of the power value interval corresponds to a higher transmit power spectral density, or a larger minimum value of the power value interval corresponds to a lower transmit power spectral density; that a smaller maximum power value detected by performing the CCA corresponds to a higher transmit power spectral density only indicates that there is an overall qualitative relationship between the maximum power value detected by performing the CCA and the transmit power spectral density. Another similar manner may be used to indicate this qualitative relationship between the two, which is not limited.

Optionally, power values possibly detected by performing the CCA are grouped into one or more power value intervals. Each power value interval corresponds to one power spectral density, and one or more power value intervals correspond to one or more power spectral densities. When the maximum power value detected by performing the CCA falls within a specific power range, a transmit power spectral density to be determined is a power spectral density corresponding to the power range, or the one or more power value intervals are directly corresponding to the one or more transmit power spectral densities. This is equivalent to broadening the CCA threshold, and changing the CCA threshold from original one fixed threshold to multiple thresholds (that is, multiple power ranges), so that an accessing probability of a station is increased, and the station may find an optimal transmit power spectral density in a CCA detection process, thereby enhancing efficiency of a system.

Further, the one-to-one correspondence between the one or more power value intervals and one or more transmit power spectral densities is specifically: the one-to-one correspondence between the power value intervals and the transmit power spectral densities is in a tabular form, as shown in Table 1.

TABLE 1

A correspondence between the power value interval and the transmit power spectral density

| Power value range | Transmit power spectral density |
| --- | --- |
| (−∞, −82 dBm) | PD20M |
| [−82 dBm, −79 dBm) | PD40M |
| [−79 dBm, −76 dBm) | PD80M |
| [−76 dBm, −73 dBm) | PD160M |

Considering that bandwidth of the primary channel is 20 MHz, a maximum transmit power spectral density that may be used on a transmission channel is PD20M, and therefore a transmit power spectral density corresponding to (−∞, −82 dBm) is set to PD20M. As the maximum power value detected by performing the CCA increases, the transmit power spectral density should decrease accordingly, for example, when the maximum power value detected by performing the CCA falls within [−82 dBm, −79 dBm), the transmit power spectral density becomes PD40M. Certainly, the transmit power spectral density only needs to present a decreasing trend with increasing of the maximum power value detected by performing the CCA (or with increasing of a range of the maximum power value detected by performing the CCA), and a specific value of a specific transmit power spectral density is not necessarily limited. For example, when the maximum power value detected by performing the CCA falls within [−82 dBm, −79 dBm), the transmit power spectral density may be PD30M (less than PD20M).

It should be understood that a one-to-one correspondence may also exist between the power value intervals and the transmit power spectral densities in a formula manner after only simple deformation is performed.

Optionally, that a one-to-one correspondence between the one or more power value intervals and one or more transmit power spectral densities is in a tabular form includes:

when the maximum power value detected by performing the CCA<a first power value, the transmit power spectral density is a first power spectral density; and when a $j^{th}$ power value≤the maximum power value detected by performing the CCA<a $(j+1)^{th}$ power value, the transmit power spectral density is a $(j+1)^{th}$ power spectral density, where $j=1, 2, \ldots, N$, and N is a quantity of secondary channels.

Alternatively, when the maximum power value detected by performing the CCA≤a first power value, the transmit power spectral density is a first power spectral density; and when a $j^{th}$ power value<the maximum power value detected by performing the CCA≤a $(j+1)^{th}$ power value, the transmit power spectral density is a $(j+1)^{th}$ power spectral density, where $j=1, 2, \ldots, N$, and N is a quantity of secondary channels.

By using a manner of simple power range division, or table or formula correspondence, the transmit power spectral density may be simply and quickly determined, so that optimized modification or real-time adjustment may be performed on division of the power value interval or the power range. Compared with the prior art in which whether a channel is idle or busy is determined by using only one CCA threshold, in this embodiment of the present invention, there are N+1 power value intervals or power ranges, and the power spectral density used for performing data transmission may be more precisely determined according to a channel status.

For example, using a schematic diagram of performing CCA detection on a primary channel and multiple secondary channels shown in FIG. 2 as an example, it is assumed that a transmit power spectral density is PD_update. When the station performs the CCA detection on the primary channel, power values detected by performing CCA in duration of the AIFS and six timeslots in which the backoff is performed are successively −85 dBm, −82 dBm, −80 dBm, −84 dBm, −81 dBm, −82 dBm, and −80 dBm, and a maximum power value detected by performing the CCA in the seven processing time periods is −80 dBm. According to Table 1, −80 dBm belongs to [−82 dBm, −79 dBm). Therefore, the transmit power spectral density PD_update is PD40M.

A process of obtaining the maximum power value detected by performing the CCA includes:

successively performing CCA detection on the primary channel for one or more processing time periods, so as to obtain one or more power values detected by performing the CCA, where a maximum value in the one or more power values detected by performing the CCA is the maximum power value detected by performing the CCA.

Specifically, a process of obtaining the maximum power value detected by performing the CCA may further be:

(1) initializing a first numerical value;

(2) successively performing CCA detection on the primary channel for one or more processing time periods, so as to obtain power values detected by performing the CCA; and if a power value detected by performing the CCA is greater than the first numerical value, updating the first numerical value to the power value detected by performing the CCA; and (3) determining the first numerical value as the maximum power value detected by performing the CCA.

That is, maximum power values in the CCA detection process are recorded in real time by using the first numerical value. When a power value that exceeds a power value currently recorded by using the first numerical value appears, the first numerical value is updated to the larger power value that appears. Otherwise, the first numerical value is kept unchanged. When detection in all processing time periods is completed, a first numerical value obtained is the maximum power value detected by performing the CCA.

In addition, the maximum power value detected by performing the CCA may be obtained by using another existing technology. This is not limited in the present invention.

Figure 3B:
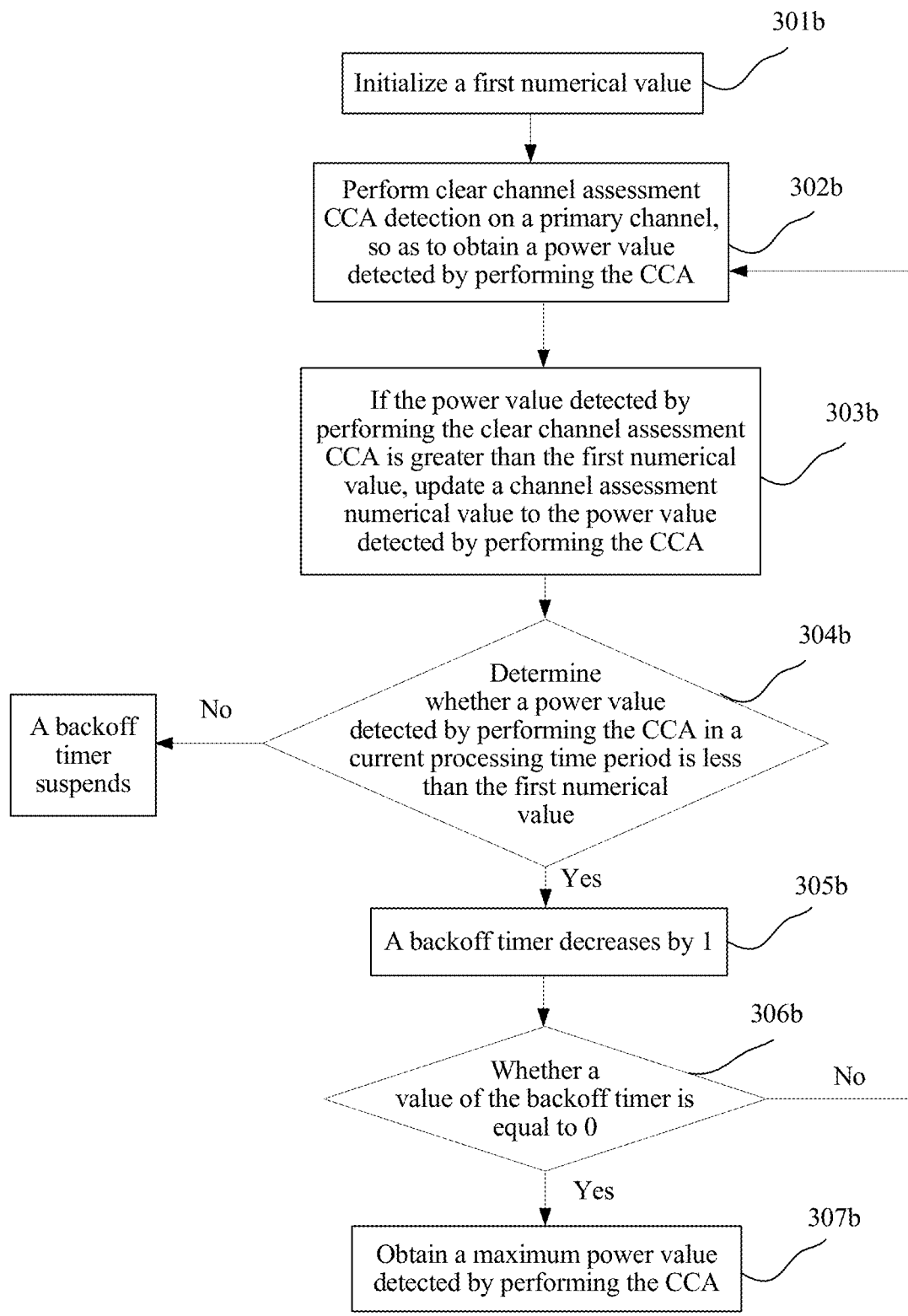
FIG. 3b is a schematic diagram of a method for obtaining a maximum power value detected by performing a clear channel assessment CCA according to an embodiment of the present invention.

Further, FIG. 3b is a schematic diagram of a method for obtaining a maximum power value detected by performing a clear channel assessment CCA according to an embodiment of the present invention. As shown in FIG. 3b, the method includes:

Step 301b: Initialize a first numerical value.

Step 302b and step 303b are successively performed for one or more processing time periods, that is, step 302b and step 303b are performed for each of the processing time periods. The one or more processing time periods include: an AIFS or a DIFS, and several timeslots.

Step 302b: Perform clear channel assessment CCA detection on a primary channel, so as to obtain a power value detected by performing the CCA.

Step 303b: If the power value detected by performing the CCA is greater than the first numerical value, update the first numerical value to the power value detected by performing the CCA.

Step 304b: Determine whether a power value detected by performing the CCA in a current processing time period is less than a preset CCA threshold; if a power value detected by performing the CCA in a current processing time period is less than a preset CCA threshold, step 805 is performed, or if a power value detected by performing the CCA in a current processing time period is not less than a preset CCA threshold, a backoff timer suspends.

Step 305b: The backoff timer decreases by 1.

Step 306b: Determine whether a value of the backoff timer is equal to 0; if the value of the backoff timer is equal to 0, step 807 is performed, or if the value of the backoff timer is not equal to 0, step 802 in a next processing time period is performed.

Step 307b: Obtain a maximum power value detected by performing the CCA.

For example, using a schematic diagram of performing CCA detection on a primary channel and multiple secondary channels shown in FIG. 2 as an example, first, a default initial value is set for the first numerical value, for example, it is assumed that the initial value of the first numerical value is equal to −83 dBm. For a first processing time period (AIFS duration), the CCA detection is performed on the primary channel, and an obtained result of the CCA detection is signal power strength detected on the primary channel, that is, a power value detected by performing the CCA is −85 dBm. When the first numerical value is −83 dBm, and the power value detected by performing the CCA is −85 dBm, that is, not greater than the first numerical value, the first numerical value is not updated. For a second processing time period (timeslot slot1), a power value detected by performing the CCA is −82 dBm, that is, greater than the first numerical value (which is −83 dBm in this case), and the first numerical value is updated from the original −83 dBm to the power value −82 dBm detected by performing the CCA. For a third processing time period (timeslot slot2), a power value detected by performing the CCA is −80 dBm, that is, greater than the first numerical value (which is −82 dBm in this case), and the first numerical value is updated from the original −82 dBm to the power value −80 dBm detected by performing the CCA. For a fourth processing time period (timeslot slot3), a power value detected by performing the CCA is −84 dBm, that is, not greater than the first numerical value (which is −80 dBm in this case), and the first numerical value is not updated. By analogy, the process continues until processing for all the processing time periods is completed. A first numerical number that may be finally obtained is −80 dBm, that is, the maximum power value detected by performing the CCA is −80 dBm.

The default initial value that is set for the first numerical value should be less than maximum values of all power value intervals, or a maximum value of a minimum range in divided ranges of the maximum power value detected by performing the CCA. Using Table 1 as an example, a power value interval whose maximum value is the smallest in four power value intervals is (−∞, −82 dBm). The default initial value that is set for the first numerical value should be less than a maximum value in the power value interval, and the default value should be less than −82 dBm. In the foregoing example, it is assumed that the initial value of the first numerical value is equal to −83 dBm.

For step 306b and step 307b, whether a current processing time period is the last processing time period is determined according to whether a value of the backoff timer is 0. Optionally, it is only necessary to determine whether the current processing time period is the last processing time period. If the current processing time period is the last processing time period, step 307b is performed, or if the current processing time period is not the last processing time period, step 302b in a next processing time period is performed.

A maximum power value detected by performing the CCA is determined in an iteration manner, and then a transmit power spectral density is determined according to a correspondence between a power value interval to which the maximum power value detected by performing the CCA belongs and the transmit power spectral density. Because the correspondence is optimal, the determined transmit power spectral density is also optimal. Therefore, a channel resource may be fully utilized, and throughput of a system may be increased.

There is a one-to-one correspondence between the one or more power value intervals and one or more transmit power spectral densities, that is, the one-to-one correspondence between the power value intervals and the transmit power spectral densities indicates an optimal transmit power spectral density under a channel status detected by performing CCA. In this way, a corresponding power value interval is determined by considering a maximum power value detected by performing a CCA on a primary channel, so as to obtain a transmission channel and a transmit power spectral density that are most suitable for a current channel status, so that a probability of accessing a channel by a station is increased, and the station may use a power spectral density as large as possible to perform data transmission. Further, when the maximum value of the power value interval is larger, the transmit power spectral density is lower, and interference caused to another signal on the primary channel is weaker. Therefore, when communication quality of another signal is ensured, a channel may be accessed for communication, a probability of accessing the channel may be increased, and a system resource may be more fully utilized.

Optionally, step 301a and step 302a may be performed in combination, that is, a method for obtaining a transmit power spectral density according to a maximum power value detected by performing a clear channel assessment CCA on a primary channel in one or more processing time periods includes:

(1) initializing a transmit power spectral density;
(2) successively for one or more processing time periods; and
(3) updating the transmit power spectral density according to a power value detected by performing CCA.

Figure 4:
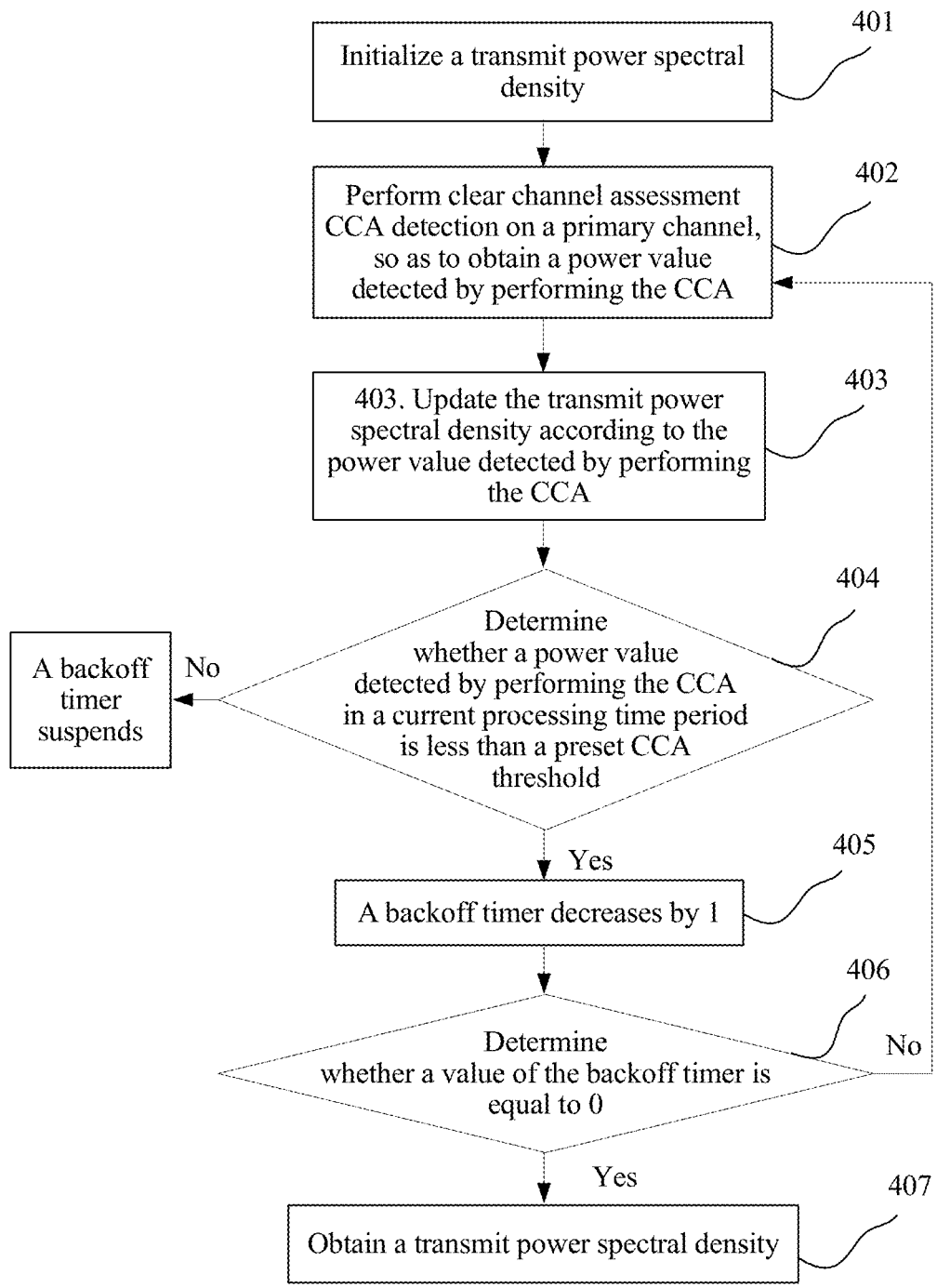
FIG. 4 is a schematic diagram of another method for obtaining a transmit power spectral density according to an embodiment of the present invention.

Specifically, FIG. 4 is a schematic diagram of another method for obtaining a transmit power spectral density according to an embodiment of the present invention. As shown in FIG. 4, the method includes:

Step 401: Initialize a transmit power spectral density.

A default initial value is set for the transmit power spectral density. Specifically, the initial value is equal to a transmit power/bandwidth of a primary channel. For example, when the bandwidth of the primary channel is 20 MHz, the initial value may be equal to PD20M.

Step 402 and step 403 are successively performed for one or more processing time periods, that is, step 402 and step 403 are performed for each of the processing time periods. The one or more processing time periods include: duration of an AIFS or a DIFS, and several timeslots.

Step 402: Perform clear channel assessment CCA detection on a primary channel, so as to obtain a power value detected by performing the CCA.

Specifically, the CCA detection is performed on the primary channel, and an obtained result of the CCA detection is signal power strength detected on the primary channel. For example, an obtained result of the CCA detection is −85 dBm.

Step 403: Update the transmit power spectral density according to the power value detected by performing the CCA.

A larger power value detected by performing the CCA indicates a lower updated transmit power spectral density. For a specific update process, refer to FIG. 6.

Step 404: Determine whether a power value detected by performing the CCA in a current processing time period is less than a preset CCA threshold; if a power value detected by performing the CCA in a current processing time period is less than a preset CCA threshold, step 405 is performed, or if a power value detected by performing the CCA in a current processing time period is not less than a preset CCA threshold, a backoff timer suspends.

Step 405: The backoff timer decreases by 1.

Step 406: Determine whether a value of the backoff timer is equal to 0; if the value of the backoff timer is equal to 0, step 407 is performed, or if the value of the backoff timer is not equal to 0, step 402 is performed.

When the value of the backoff timer is not equal to 0, and there is still a processing time period in which the CCA detection is not performed, the CCA detection should be performed in a next processing time period.

Step 407: Obtain a transmit power spectral density.

A last updated transmit power spectral density is a finally obtained transmit power spectral density, that is, for the transmit power spectral density updated in step 403, as long as a value of the backoff timer is equal to 0, a transmit power spectral density obtained by means of update is the transmit power spectral density determined according to a channel status of the primary channel. Therefore, step 404 to step 407 are optional steps.

Figure 5:
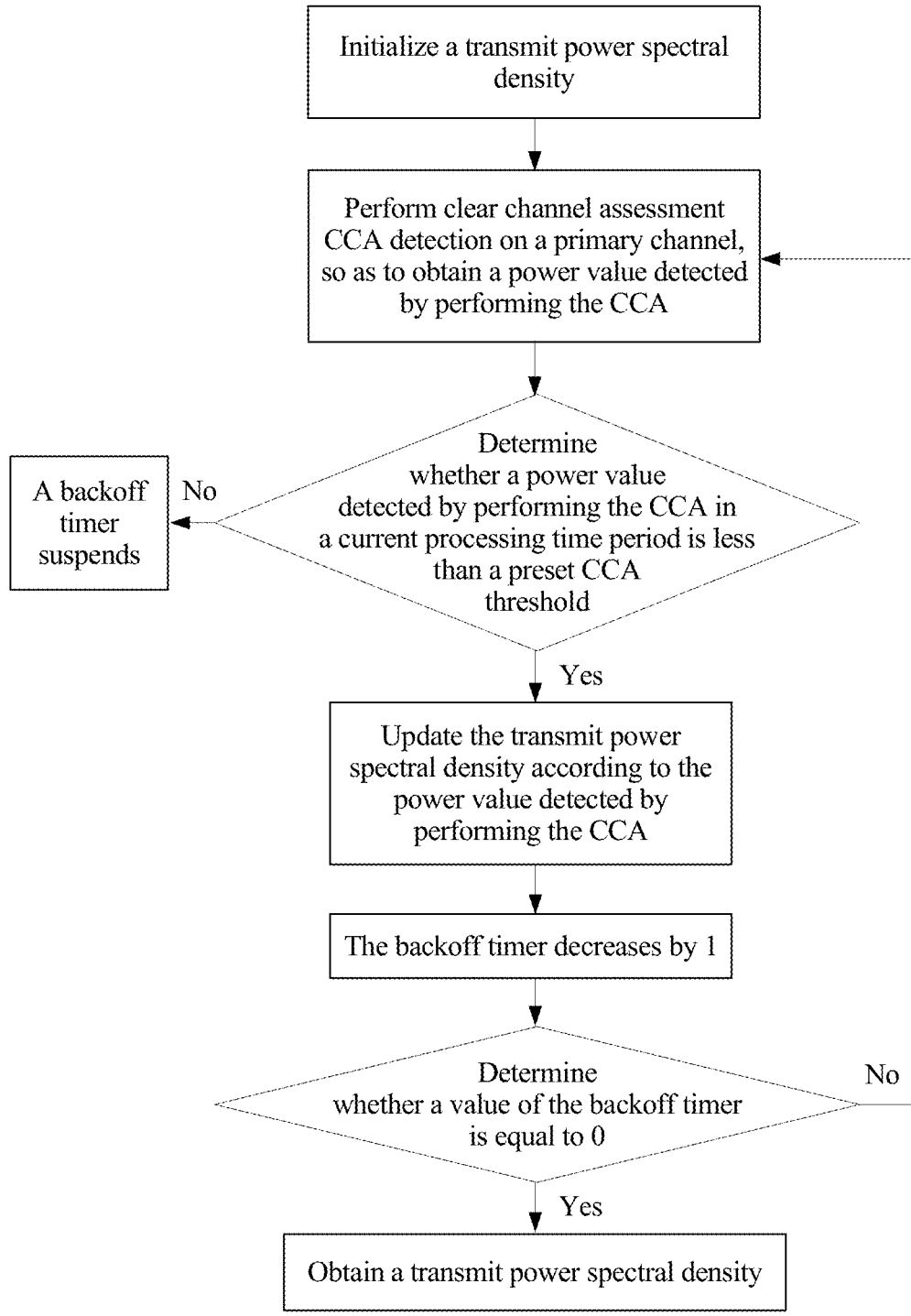
FIG. 5 is a schematic diagram of another method for determining a transmit power spectral density according to an embodiment of the present invention.

Optionally, FIG. 5 is a schematic diagram of another method for determining a transmit power spectral density according to an embodiment of the present invention. As shown in FIG. 5, step 404 may be performed before step 403 is performed, that is, whether a power value detected by performing the CCA in a current processing time period is less than a preset CCA threshold is determined; if a power value detected by performing the CCA in a current processing time period is not less than a preset CCA threshold, a backoff timer suspends, or if a power value detected by performing the CCA in a current processing time period is less than a preset CCA threshold, the step of updating the transmit power spectral density according to the power value detected by performing the CCA is performed. After the transmit power spectral density is updated, step 405 is performed: The backoff timer decreases by 1.

For step 405 and step 406, whether a current processing time period is the last processing time period is determined according to whether a value of the backoff timer is 0. Optionally, it is only necessary to determine whether the current processing time period is the last processing time period; if the current processing time period is the last processing time period, step 407 is performed, or if the current processing time period is not the last processing time period, step 402 in a next processing time period is performed.

Figure 6:
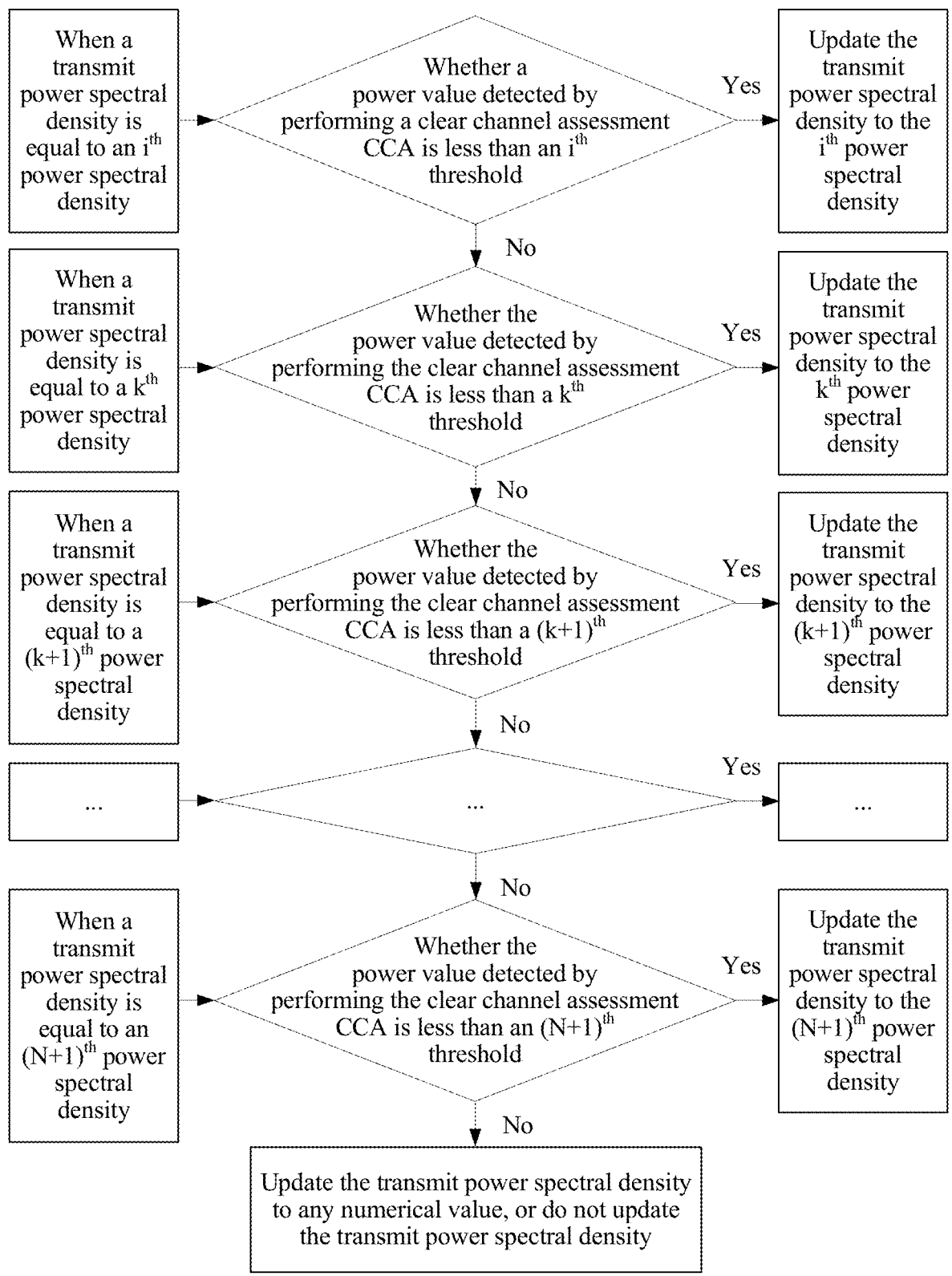
FIG. 6 is a schematic diagram of a method for updating a transmit power spectral density according to an embodiment of the present invention.

Specifically, for the step of updating the transmit power spectral density according to a power value detected by performing CCA in (3), and the step of updating the transmit power spectral density in step 403, FIG. 6 is a schematic diagram of a method for updating a transmit power spectral density according to an embodiment of the present invention. As shown in FIG. 6, when a transmit power spectral density is equal to an $i^{th}$ power spectral density, if a power value detected by performing a CCA is less than an $i^{th}$ threshold, the transmit power spectral density is updated to the $i^{th}$ power spectral density;

if a power value detected by performing a CCA is not less than a $k^{th}$ threshold, and less than a $(k+1)^{th}$ threshold, the transmit power spectral density is updated to a $(k+1)^{th}$ power spectral density; or if a power value detected by performing a CCA is not less than an $(N+1)^{th}$ threshold, the transmit power spectral density is updated to any numerical value, or the transmit power spectral density is not updated; where i is a positive integer from 1 to N, k is a positive integer from i to N, and N is a quantity of the multiple secondary channels, that is, i may be 1, 2, ..., N, and k may be i, i+1, ..., N.

N≥1. In addition, this embodiment of the present invention also applies to the case of one secondary channel. Therefore, in all embodiments of the present invention, N may be 1, or may be any positive integer greater than 1.

The $(k+1)^{th}$ power spectral density≤a $k^{th}$ power spectral density, and the $k^{th}$ threshold≤the $(k+1)^{th}$ threshold.

Setting multiple thresholds (a first to the $(N+1)^{th}$ thresholds) may effectively increase a probability of accessing a channel and further improve transmission efficiency of a system.

Further, as shown in FIG. 6, when the transmit power spectral density is equal to the $k^{th}$ power spectral density, according to a manner similar to the foregoing manner, a result of the CCA detection is first compared with the $k^{th}$ threshold. When the result of the CCA detection is less than the $k^{th}$ threshold, the transmit power spectral density is updated to the $k^{th}$ power spectral density; otherwise, the result of the CCA detection is compared with the $(k+1)^{th}$ threshold. By analogy, the process continues until the transmit power spectral density is determined. When the result of the CCA detection is not less than the $(N+1)^{th}$ threshold, the result of the CCA detection exceeds the preset CCA threshold. Therefore, in this case, a backoff timer finally suspends regardless of whether the transmit power spectral density is updated, indicating that the channel is busy, and a TXOP cannot be obtained.

When the transmit power spectral density is equal to the $(k+1)^{th}$ power spectral density, ..., when the transmit power spectral density is equal to the $(N+1)^{th}$ power spectral density, steps are all performed in similar manners, and details are not described herein.

For example, using a schematic diagram of performing CCA detection on a primary channel and multiple secondary channels shown in FIG. 2 as an example, it is assumed that a transmit power spectral density is PD_update, a first power spectral density is PD20M, a second power spectral density is PD40M, a third power spectral density is PD80M, and a fourth power spectral density is PD160M, and it is assumed that a first power value is −82 dBm, a second power value is −79 dBm, a third power value is −76 dBm, and a fourth power value is −73 dBm.

First, PD_update is initialized to be the first power spectral density PD20M. For a first processing time period (AIFS duration), PD_update is PD20M, and a power value detected by performing the CCA is −85 dBm, which is less than the first power value −82 dBm. In this case, PD_update is updated to PD20M (or which may be not updated in this case). For a second processing time period (timeslot slot1), PD_update is PD20M, and a power value detected by performing the CCA is −82 dBm, which is not less than the first power value −82 dBm, and less than the second power value −79 dBm. In this case, PD_update is updated to PD40M. Similarly, for a third processing time period (timeslot slot2) to a seventh processing time period (timeslot slot6), PD_update is PD20M, and all power values detected by performing the CCA are not less than the first power value −82 dBm, and less than the second power value −79 dBm. In this case, PD_update is updated to PD40M (or which may be not updated). After processing for the last processing time period (timeslot slot6) is completed, an obtained transmit power spectral density PD_update is PD40M.

According to a maximum power value detected by performing a CCA on a primary channel in one or more processing time periods, an interference status of a channel, or strength of another signal on the channel may be obtained. According to the interference status or strength of another channel, a magnitude of a transmit power spectral density is pertinently determined. This ensures that interference to a signal in another station is within an appropriate range, and ensures that a transmit power spectral density of a current station is maximized. Therefore, a channel resource may be fully utilized, and throughput of a system may be increased.

A transmit power spectral density is obtained according to a maximum power value detected by performing a clear channel assessment CCA on a primary channel in one or more processing time periods; that is, a transmission channel and a transmission power spectral density that are most suitable for a current channel status are determined by considering a CCA detection status of the primary channel, so that a probability of accessing a channel by a station is increased, and the station may use a power spectral density as large as possible to perform data transmission. Further, when the maximum power value detected by performing the CCA on the primary channel is larger, the transmit power spectral density is lower, and interference caused to another signal on the primary channel is weaker. Therefore, when communication quality of another signal is ensured, a channel may be accessed for communication, a probability of accessing the channel may be increased, and a system resource may be more fully utilized.

Step 303a: When a transmit opportunity TXOP is obtained, perform data transmission on a transmission channel by using a power spectral density that is not greater than the transmit power spectral density.

Optionally, the step of performing data transmission by using a power spectral density that is not greater than a transmit power spectral density includes: determining a maximum transmit power according to the transmit power spectral density and transmission bandwidth, then ensuring, by means of power control, that an actual transmit power is not greater than the determined maximum transmit power, and performing the data transmission.

Optionally, if a first secondary channel is not idle, the transmission channel includes a primary channel; if first n secondary channels are all idle, and an $(n+i)^{th}$ secondary channel is not idle, the transmission channel includes a primary channel and the first n secondary channels; or if N secondary channels are all idle, the transmission channel includes the primary channel and the N secondary channels, where n=1, 2, ..., N−1, and N is a quantity of the secondary channels.

It should be understood that, that the first n secondary channels are all idle indicates that n secondary channels close to the primary channel are idle. For example, in FIG. 1, a secondary 20 MHz channel may be considered as first one secondary channel, a secondary 20 MHz channel and a secondary 40 MHz channel may be considered as first two secondary channels, and a secondary 20 MHz channel, a secondary 40 MHz channel, and a secondary 80 MHz channel may be considered as first three secondary channels.

Specifically, a station performs CCA detection on one or more secondary channels, and determines transmission bandwidth according to a result of the CCA detection, that is, a station determines whether one or more secondary channels are idle according to magnitudes of powers detected by performing the CCA on the one or more secondary channels and CCA thresholds respectively preset for the one or more secondary channels, and determines the transmission bandwidth according to whether the one or more secondary channels are idle. When idle secondary channels tightly close to the primary channel are consecutive, a larger quantity of the idle secondary channels indicates larger determined transmission bandwidth.

For example, using a schematic diagram of performing CCA detection on a primary channel and multiple secondary channels shown in FIG. 2 as an example, when the station obtains a transmit opportunity (English: Transmission Opportunity, TXOP for short) (that is, when the station determines that the primary channel is idle by performing the CCA detection, that is, within the duration of the AIFS or the DIFS, and within duration of various timeslots in which backoff is performed, a result of the CCA detection on the primary channel is less than the preset CCA threshold), the station should perform one of the following steps:

if the secondary 20 MHz channel, the secondary 40 MHz channel, and the secondary 80 MHz channel are all idle within the duration of the PIFS closely before a moment at which the TXOP starts to appear, sending a data frame of a 160 MHz or 80 MHz+80 MHz mask (English: mask);

if the secondary 20 MHz channel and the secondary 40 MHz channel are both idle within the duration of the PIFS closely before a moment at which the TXOP starts to appear, sending a data frame of an 80 MHz mask on a primary 80 MHz channel by using a power spectral density less than or equal to PD_update;

if the secondary 20 MHz channel is idle within the duration of the PIFS closely before a moment at which the TXOP starts to appear, sending a data frame of a 40 MHz mask on a primary 40 MHz channel by using a power spectral density less than or equal to PD_update; or sending a data frame of a 20 MHz mask on the primary channel by using a power spectral density less than or equal to PD_update.

The primary channel, the secondary 20 MHz channel, and the secondary 40 MHz channel constitute the primary 80 MHz channel, and the primary channel and the secondary 20 MHz channel constitute the primary 40 MHz channel. That the channel is idle within the duration of the PIFS indicates that within the duration of the PIFS, no matter when CCA sampling is performed, a result of the CCA sampling is less than the preset CCA threshold, and it is determined that the channel is idle.

Using the transmit power spectral density as an upper limit of the power spectral density to perform data transmission on available transmission bandwidth may effectively utilize a channel resource and increase throughput of a system.

Figure 7:
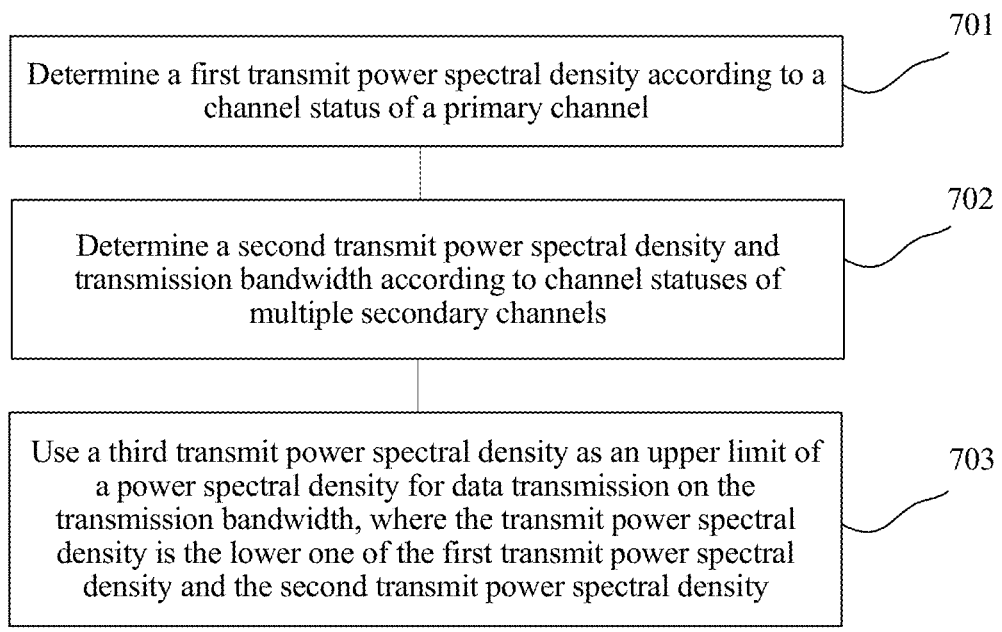
FIG. 7 is a schematic diagram of a data transmission method according to an embodiment of the present invention.

FIG. 7 is a schematic diagram of a data transmission method according to an embodiment of the present invention. As shown in FIG. 7, the method includes:

Step 701: Determine a first transmit power spectral density according to a channel status of a primary channel.

A station performs CCA detection on the primary channel, and determines the first transmit power spectral density according to a result of the CCA detection, that is, the first transmit power spectral density is determined according to a magnitude of a power detected by performing the CCA on the primary channel. A smaller power detected by performing the CCA indicates a higher determined first transmit power spectral density.

Optionally, powers possibly obtained by means of detection may be grouped into one or more power ranges. Each power range corresponds to one power spectral density. When a power obtained by means of CCA detection falls within a specific power range, the determined first transmit power spectral density is a power spectral density corresponding to the power range.

Figure 8:
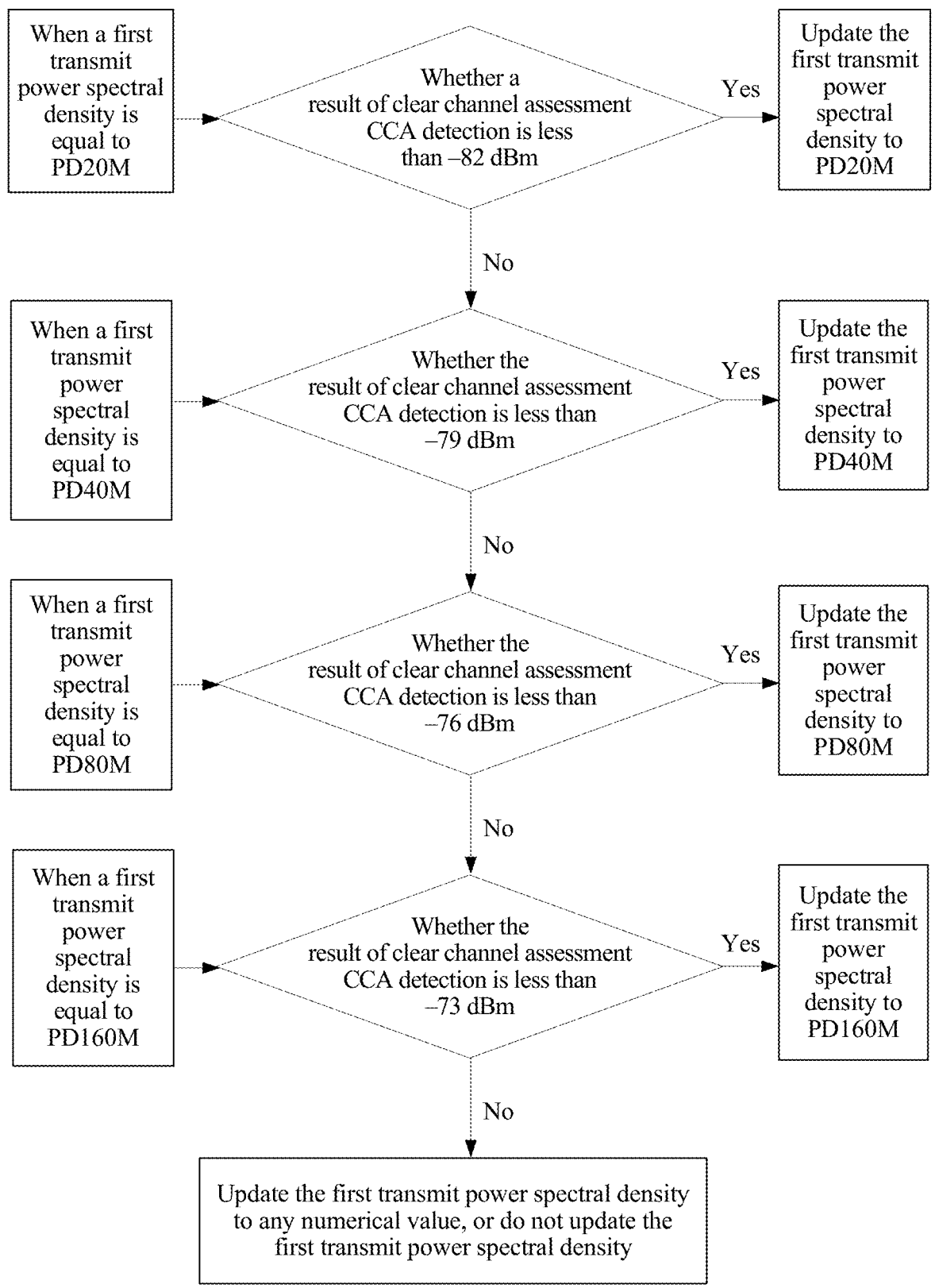
FIG. 8 is a schematic diagram of a specific example of updating a first transmit power spectral density.

For example, FIG. 8 is a schematic diagram of a specific example of updating a first transmit power spectral density. As shown in FIG. 8, for a processing time period, when the first transmit power spectral density is equal to PD20M, it is determined whether a result of CCA detection is less than −82 dBm.

If the result of the CCA detection is less than −82 dBm, the first transmit power spectral density is kept unchanged, or it may be considered that the first transmit power spectral density is updated to PD20M, and it is continuously determined whether the result of the CCA detection is less than −82 dBm in a next processing time period. If the result of the CCA detection is greater than −82 dBm, it is determined whether the result of the CCA detection is greater than −82 dBm and less than −79 dBm.

If the result of the CCA detection is greater than −82 dBm and less than −79 dBm, the first transmit power spectral density is updated to PD40M, and it is continuously determined whether the result of the CCA detection is greater than −82 dBm and less than −79 dBm in a next processing time period. If the result of the CCA detection is greater than −79 dBm, it is determined whether the result of the CCA detection is greater than −79 dBm and less than −76 dBm.

If the result of the CCA detection is greater than −79 dBm and less than −76 dBm, the first transmit power spectral density is updated to PD80M, and it is continuously determined whether the result of the CCA detection is greater than −79 dBm and less than −76 dBm in a next processing time period. If the result of the CCA detection is greater than −76 dBm, it is determined whether the result of the CCA detection is greater than −76 dBm and less than −73 dBm.

If the result of the CCA detection is greater than −76 dBm and less than −73 dBm, CCA update=−73 dBm and PD_update=PD160M are respectively updated, and it is continuously determined whether the result of the CCA detection is greater than −76 dBm and less than −73 dBm in a next processing time period. If the result of the CCA detection is greater than −73 dBm, the first transmit power spectral density is updated to any numerical value, or the first transmit power spectral density is not updated.

Further, step 701 may be: obtaining a first transmit power spectral density according to a maximum power value detected by performing a clear channel assessment CCA on a primary channel in one or more processing time periods. In this case, a method for determining the first transmit power spectral density is the same as or similar to a method for determining a transmit power spectral density in step 301a and step 302a, and related technical features are also the same or similar. Details are not described herein.

Step 702: Determine a second transmit power spectral density and transmission bandwidth according to channel statuses of multiple secondary channels.

A station performs the CCA detection on multiple secondary channels, and determines the second transmit power spectral density according to results of the CCA detection, that is, a station determines whether multiple secondary channels are respectively idle according to magnitudes of powers detected by performing the CCA on the multiple secondary channels and CCA thresholds respectively preset for the multiple secondary channels, and determines the transmission bandwidth and the second transmit power spectral density according to whether the multiple secondary channels are idle. When idle secondary channels tightly close to the primary channel are consecutive, a larger quantity of the idle secondary channels indicates larger determined transmission bandwidth and a lower second transmit power spectral density.

Optionally, the step of determining a second transmit power spectral density and transmission bandwidth according to channel statuses of multiple subordinate channels includes:

within a processing time period before data transmission is performed, if a first secondary channel is not idle, setting the transmission bandwidth as first bandwidth, and setting the second transmit power spectral density as a first power spectral density;

if first n secondary channels are all idle, and an $(n+1)^{th}$ secondary channel is not idle, setting the transmission bandwidth as $n^{th}$ bandwidth, and setting the second transmit power spectral density as an $n^{th}$ power spectral density; or if first N secondary channels are all idle, setting the transmission bandwidth as $(N+1)^{th}$ bandwidth, and setting the second transmit power spectral density as an $(N+1)^{th}$ power spectral density, where n is a positive integer from 1 to N−1, and N is a quantity of the multiple secondary channels.

As a quantity n of idle channels becomes larger, the transmission bandwidth is larger, and the second transmit power spectral density is lower.

Figure 9:
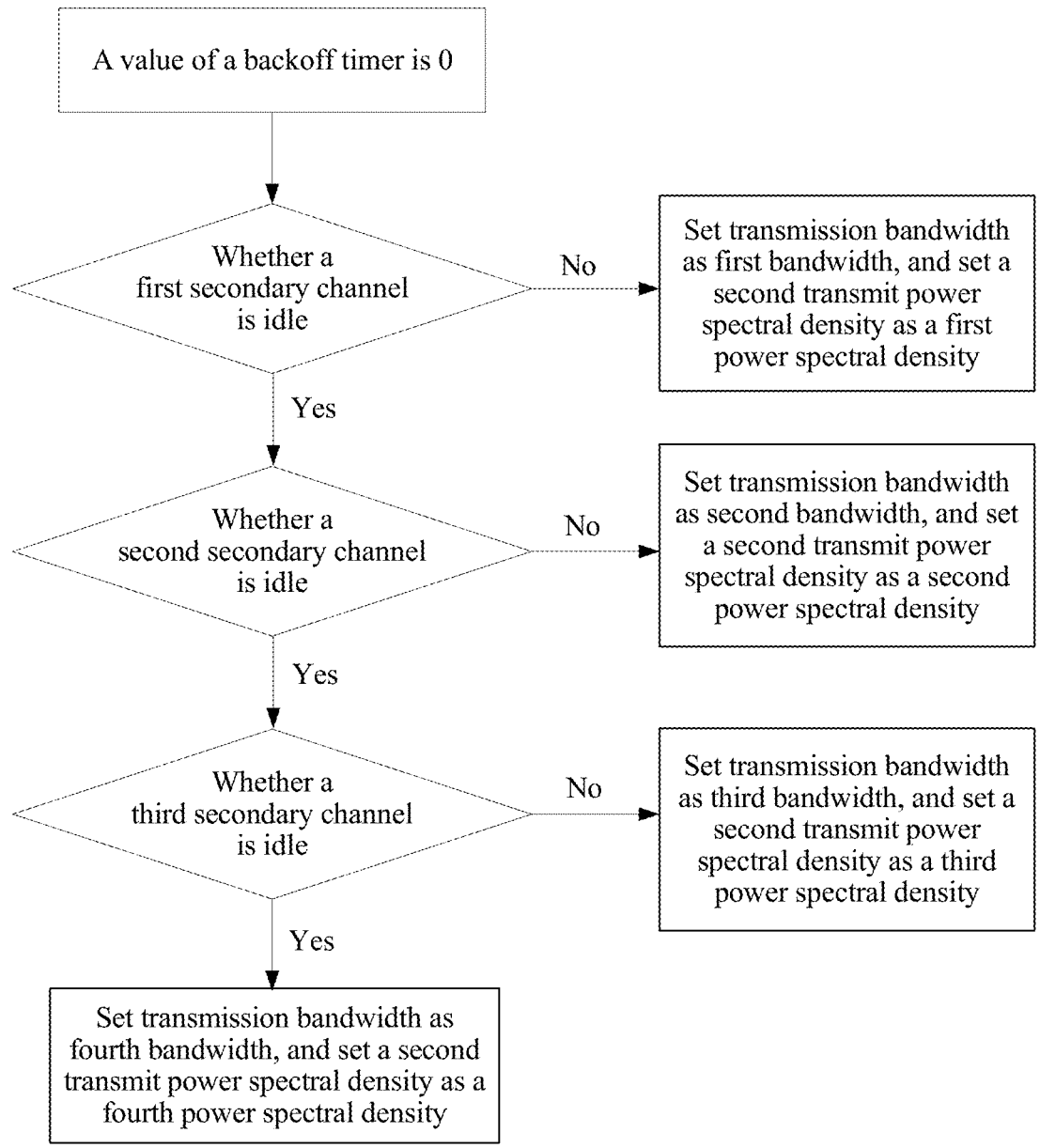
FIG. 9 is a schematic diagram of a method for determining a second transmit power spectral density and transmission bandwidth when there are three secondary channels.

Further, FIG. 9 is a schematic diagram of a method for determining a second transmit power spectral density and transmission bandwidth when there are three secondary channels. As shown in FIG. 9, when N=3, a value of a backoff timer is 0, and within a PIFS time period before data transmission is performed, if a first secondary channel is not idle, the transmission bandwidth is set as first bandwidth, and the second transmit power spectral density is set as a first power spectral density;

if a first secondary channel is idle, and a second secondary channel is not idle, the transmission bandwidth is set as second bandwidth, and the second transmit power spectral density is set as a second power spectral density;

if a first secondary channel is idle, a second secondary channel is idle, and a third secondary channel is not idle, the transmission bandwidth is set as third bandwidth, and the second transmit power spectral density is set as a third power spectral density; or if a first secondary channel is idle, a second secondary channel is idle, and a third secondary channel is idle, the transmission bandwidth is set as fourth bandwidth, and the second transmit power spectral density is set as a fourth power spectral density.

A sequence of width of the bandwidth is: the first bandwidth≤the second bandwidth≤the third bandwidth≤the fourth bandwidth; a sequence of magnitudes of the power spectral density is: the first power spectral density≥the second power spectral density≥the third power spectral density≥the fourth power spectral density.

For example, it is assumed that the transmission bandwidth is BW, and the second transmit power spectral density is PD_BW. After a value of the backoff timer decreases to 0, it is determined whether a secondary 20 MHz channel is idle within the duration of the PIFS closely before a moment at which the value of the backoff timer decreases to 0.

If the secondary 20 MHz channel is busy within the time period, BW=20 MHz, and PD_BW=PD20M; if the secondary 20 MHz channel is idle within the time period, it is further determined whether a secondary 40 MHz channel is idle within the time period.

If the secondary 40 MHz channel is busy within the time period, BW=40 MHz, and PD_BW=PD40M; if the secondary 40 MHz channel is idle within the time period, it is further determined whether a secondary 80 MHz channel is idle within the time period.

If the secondary 80 MHz channel is busy within the time period, BW=80 MHz, and PD_BW=PD80M; if the secondary 80 MHz channel is idle within the time period, BW=160 MHz, and PD_BW=PD160M.

Step 703: Use a third transmit power spectral density as an upper limit of a power spectral density for data transmission on the transmission bandwidth. The third transmit power spectral density is the lower one of the first transmit power spectral density and the second transmit power spectral density.

The transmission bandwidth, the first transmit power spectral density, and the second transmit power spectral density may be obtained according to step 701 and step 702. The lower one of the first transmit power spectral density and the second transmit power spectral density is used as the upper limit of the power spectral density for data transmission. Data transmission is performed on the transmission bandwidth determined in step 702.

For example, the CCA detection is performed on the primary channel; if a result of the CCA detection in a current timeslot is less than a preset CCA threshold, the backoff timer decreases by 1; otherwise, the backoff timer suspends. After the backoff timer decreases by 1, it is necessary to determine whether a current value of the backoff timer is 0. If the current value of the backoff timer is not 0, the CCA detection is continuously performed on the primary channel. If the current value of the backoff timer is 0, the first transmit power spectral density is determined, and the CCA detection is performed on multiple secondary channels. The transmission bandwidth and the second transmit power spectral density are further determined according to results of the CCA detection. The lower one of the first transmit power spectral density and the second transmit power spectral density is selected as the upper limit of the power spectral density for data transmission.

Further, step 702 and step 703 may be performed in combination, bandwidth and an upper limit of the power spectral density that are finally used to transmit data are determined directly according to whether the multiple secondary channels are idle, and data transmission is performed.

For example, using a schematic diagram of performing CCA detection on a primary channel and multiple secondary channels shown in FIG. 2 as an example, when the station performs the CCA detection on the primary channel, the first transmit power spectral density PD_update is obtained according to a result of the CCA detection. It should be understood that a time period in which the CCA detection is performed includes at least time used for determining whether a channel is idle, such as an AIFS, a DIFS, an EIFS, or the like, and timeslots in which the backoff is performed. A correspondence between a result of CCA detection and PD_update is shown in Table 2.

TABLE 2

A correspondence between a result of CCA detection and PD_update

| Result of CCA detection | PD_update |
|---|---|
| (−∞, −82 dBm) | PD20M |
| [−82 dBm, −79 dBm) | PD40M |
| [−79 dBm, −76 dBm) | PD80M |
| [−76 dBm, −73 dBm) | PD160M |

When the station obtains a transmit opportunity (English: Transmission Opportunity, TXOP for short) (that is, when the station determines that the primary channel is idle by performing the CCA detection, that is, within the duration of the AIFS or the DIFS and duration of various timeslots in which the backoff is performed, a result of the CCA detection on the primary channel is less than a threshold), the station should perform one of the following steps:

if the secondary 20 MHz channel, the secondary 40 MHz channel, and the secondary 80 MHz channel are all idle within the duration of the PIFS closely before a moment at which the TXOP starts to appear, sending a data frame of a 160 MHz or 80 MHz+80 MHz mask (English: mask);

if the secondary 20 MHz channel and the secondary 40 MHz channel are both idle within the duration of the PIFS closely before a moment at which the TXOP starts to appear, sending a data frame of an 80 MHz mask on a primary 80 MHz channel by using a power spectral density less than or equal to min{PD_update, PD80M};

if the secondary 20 MHz channel is idle within the duration of the PIFS closely before a moment at which the TXOP starts to appear, sending a data frame of a 40 MHz mask on a primary 40 MHz channel by using a power spectral density less than or equal to min {PD_update, PD40M}; or sending a data frame of a 20 MHz mask on the primary channel by using a power spectral density less than or equal to min{PD_update, PD20M}.

Figure 10:
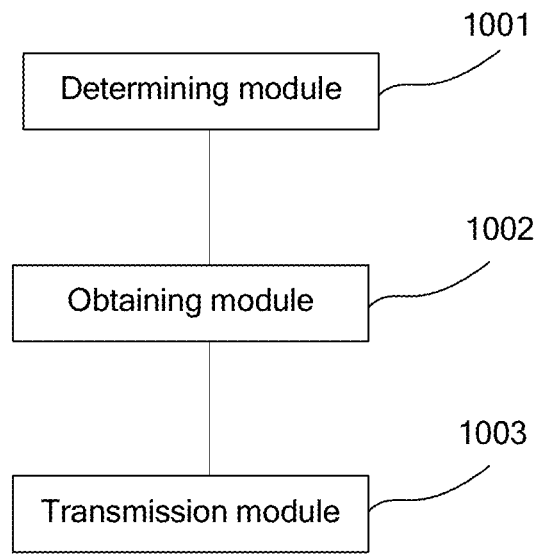
FIG. 10 is a schematic diagram of a data transmission apparatus according to an embodiment of the present invention.

Corresponding to the foregoing method embodiments, an embodiment of the present invention further provides a data transmission apparatus. Referring to FIG. 10, the apparatus includes:

a determining module 1001, configured to determine, according to a maximum power value detected by performing a clear channel assessment CCA on a primary channel in one or more processing time periods, a power value interval to which the maximum power value detected by performing the CCA belongs, where the determined power value interval is one of one or more power value intervals that do not overlap each other;

an obtaining module 1002, configured to obtain a transmit power spectral density according to the power value interval determined by the determining module, where there is a one-to-one correspondence between the one or more power value intervals and one or more transmit power spectral densities; and a transmission module 1003, configured to: when a transmit opportunity TXOP is obtained, perform data transmission on a transmission channel by using a power spectral density that is not greater than the transmit power spectral density obtained by the obtaining module.

Some related technical features such as the maximum power value detected by performing the CCA, the power value interval, the transmit power spectral density, the transmission channel, and the like are similar or corresponding to some related technical features in the foregoing method embodiments, which are not repeatedly described in this embodiment.

Figure 11:
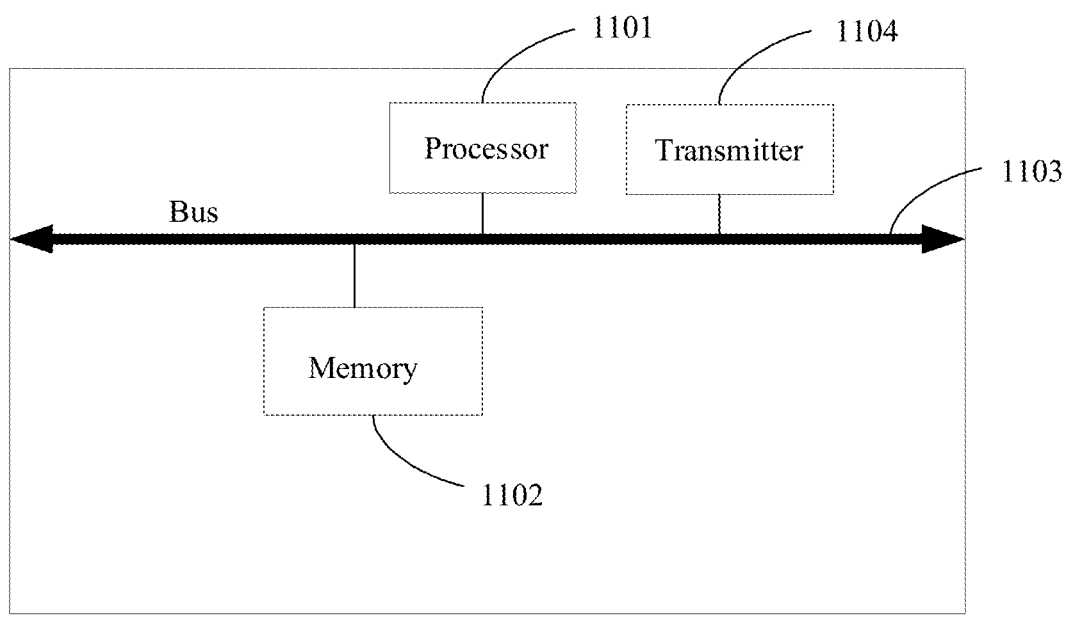
FIG. 11 is a schematic diagram of a data transmission device according to an embodiment of the present invention.

Corresponding to the foregoing method embodiments, an embodiment of the present invention further provides a data transmission device. Referring to FIG. 11, the device includes:

a processor 1101, a memory 1102, a transmitter 1104, and a bus 1103. The processor 1101, the memory 1102, and the transmitter 1104 are connected by using the bus to perform data transmission. The memory is configured to store data processed by the processor.

The processor 1101 is configured to determine, according to a maximum power value detected by performing a clear channel assessment CCA on a primary channel in one or more processing time periods, a power value interval to which the maximum power value detected by performing the CCA belongs, where the determined power value interval is one of one or more power value intervals that do not overlap each other; and obtain a transmit power spectral density according to the determined power value interval, where there is a one-to-one correspondence between the one or more power value intervals and one or more transmit power spectral densities.

The transmitter 1104 is configured to: when a transmit opportunity TXOP is obtained, perform data transmission on a transmission channel by using a power spectral density that is not greater than the transmit power spectral density obtained by the processor.

Some related technical features such as the maximum power value detected by performing the CCA, the power value interval, the transmit power spectral density, the transmission channel, and the like are similar or corresponding to some related technical features in the foregoing method embodiments, which are not repeatedly described in this embodiment.

It should be understood that in the embodiments of the present invention, a transmit power spectral density, a first transmit power spectral density, a second transmit power spectral density, and a third transmit power spectral density may indicate an upper limit or an upper limit value of a power spectral density used for performing data transmission, for example, the transmit power spectral density indicates an upper limit or an upper limit value of the power spectral density used for performing data transmission, or an upper limit of the transmit power spectral density.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit. Specifically, the integrated unit may be implemented by software plus necessary universal hardware. The universal hardware includes a universal integrated circuit, a general purpose CPU (English: Central Processing Unit; Chinese: central processing unit), a general purpose digital signal processor (English: Digital Signal Processor, DSP for short), a field programmable gate array (English: Field-Programming Gate Array, FPGA for short), a programmable logic device (English: Programmable Logical Device, PLD for short), a general purpose memory, a general purpose component, and the like. Certainly, the integrated unit may be implemented by dedicated hardware including an application-specific integrated circuit (English: Application Specific Integrated Circuit, ASIC for short), a dedicated CPU, a dedicated memory, a dedicated component, and the like.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

The software or instruction may further be transmitted by using a transmission medium. For example, if software is transmitted from a website, a server or another remote source by using a coaxial cable, an optical fiber/cable, a twisted pair, a digital subscriber line (English: Digital Subscriber Line, DSL for short), or wireless technologies (such as infrared ray, radio, and microwave), the coaxial cable, optical fiber/cable, twisted pair, DSL, or wireless technologies (such as infrared ray, radio, and microwave) are included in a definition of the transmission medium.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
   determining, according to a maximum power value detected by performing a clear channel assessment (CCA) on a primary channel in one or more processing time periods, a power value interval to which the maximum power value detected by performing the CCA belongs, wherein the determined power value interval is one of one or more power value intervals indicating power value ranges that do not overlap each other;
   obtaining, from among information indicating correspondences of the one or more power value intervals indicating power value ranges to transmit power spectral densities, a transmit power spectral density corresponding to the power value interval determined according to the detected maximum power value, wherein the information indicating the correspondences is a one-to-one correspondence between the one or more power value intervals indicating power value ranges and the one or more transmit power spectral densities; and
   when a transmit opportunity (TXOP) is obtained, performing data transmission on a transmission channel by using a power spectral density that is not greater than the obtained transmit power spectral density.

2. The data transmission method according to claim 1, wherein
   the one-to-one correspondence between the one or more power value intervals and one or more transmit power spectral densities meets:
   a smaller maximum value of the power value interval corresponds to a higher transmit power spectral density; or
   a larger minimum value of the power value interval corresponds to a lower transmit power spectral density.

3. The data transmission method according to claim 1, wherein
   the information indicating the correspondences is in a tabular form.

4. The data transmission method according to claim 3, wherein the tabular form comprises:
when the maximum power value detected by performing the CCA<a first power value, the transmit power spectral density is a first power spectral density; and
when a $j^{th}$ power value≤the maximum power value detected by performing the CCA<a $(j+1)^{th}$ power value, the transmit power spectral density is a $(j+1)^{th}$ power spectral density, wherein
j=1, 2, ..., N, and N is a quantity of secondary channels.

5. The data transmission method according to claim 3, wherein the tabular form comprises:
when the maximum power value detected by performing the CCA≤a first power value, the transmit power spectral density is a first power spectral density; and
when a $j^{th}$ power value<the maximum power value detected by performing the CCA≤a $(j+1)^{th}$ power value, the transmit power spectral density is a $(j+1)^{th}$ power spectral density, wherein
j=1, 2, ..., N, and N is a quantity of secondary channels.

6. The data transmission method according to claim 1, wherein a process of obtaining the maximum power value detected by performing the CCA comprises:
successively performing CCA detection on the primary channel for one or more processing time periods, so as to obtain one or more power values detected by performing the CCA, wherein
a maximum value in the one or more power values detected by performing the CCA is the maximum power value detected by performing the CCA.

7. The data transmission method according to claim 1, wherein the transmission channel is:
if a first secondary channel is not idle, the transmission channel comprises the primary channel;
if first n secondary channels are all idle, and an $(n+1)^{th}$ secondary channel is not idle, the transmission channel comprises the primary channel and the first n secondary channels; or
if N secondary channels are all idle, the transmission channel comprises the primary channel and the N secondary channels, wherein
n=1, 2, ..., N−1, and N is the quantity of the secondary channels.

8. A data transmission device, comprising a processor, a memory, a transmitter, and a bus, wherein the processor, the memory, and the transmitter are connected by using the bus to perform data transmission, and the memory is configured to store data processed by the processor;

the processor is configured to,
determine, according to a maximum power value detected by performing a clear channel assessment (CCA) on a primary channel in one or more processing time periods, a power value interval to which the maximum power value detected by performing the CCA belongs, wherein the determined power value interval is one of one or more power value intervals indicating power value ranges that do not overlap each other; and
obtain, from among information indicating correspondences of the one or more power value intervals indicating power value ranges to transmit power spectral densities, a transmit power spectral density corresponding to the power value interval determined according to the detected maximum power value, wherein the information indicating the correspondences is a one-to-one correspondence between the one or more power value intervals indicating power value ranges and the one or more transmit power spectral densities; and
the transmitter is configured to,
when a transmit opportunity (TXOP) is obtained, perform data transmission on a transmission channel by using a power spectral density that is not greater than the transmit power spectral density obtained by the processor.

9. The data transmission device according to claim 8, wherein the one-to-one correspondence between the one or more power value intervals and one or more transmit power spectral densities meets:
a smaller maximum value of the power value interval corresponds to a higher transmit power spectral density; or
a larger minimum value of the power value interval corresponds to a lower transmit power spectral density.

10. The data transmission device according to claim 9, wherein the information indicating the correspondences is in a tabular form.

11. The data transmission device according to claim 10, wherein the tabular form comprises:
when the maximum power value detected by performing the CCA<a first power value, the transmit power spectral density is a first power spectral density; and
when a $j^{th}$ power value≤the maximum power value detected by performing the CCA<a $(j+1)^{th}$ power value, the transmit power spectral density is a $(j+1)^{th}$ power spectral density, wherein
j=1, 2, ..., N, and N is a quantity of secondary channels.

12. The data transmission device according to claim 10, wherein the tabular form comprises:
when the maximum power value detected by performing the CCA≤a first power value, the transmit power spectral density is a first power spectral density; and
when a $j^{th}$ power value<the maximum power value detected by performing the CCA≤a $(j+1)^{th}$ power value, the transmit power spectral density is a $(j+1)^{th}$ power spectral density, wherein
j=1, 2, ..., N, and N is a quantity of secondary channels.

13. The data transmission device according to claim 12, wherein the processor is further configured to successively perform CCA detection on the primary channel for one or more processing time periods, so as to obtain one or more power values detected by performing the CCA, wherein a maximum value in the one or more power values detected by performing the CCA is the maximum power value detected by performing the CCA.

14. The data transmission device according to claim 8, wherein the transmission channel is:
if a first secondary channel is not idle, the transmission channel comprises the primary channel;
if first n secondary channels are all idle, and an $(n+1)^{th}$ secondary channel is not idle, the transmission channel comprises the primary channel and the first n secondary channels; or
if N secondary channels are all idle, the transmission channel comprises the primary channel and the N secondary channels, wherein n=1, 2, ..., N−1, and N is the quantity of the secondary channels.

15. The data transmission device according to claim 8, wherein
the device is a station device or an access point device.

* * * * *